Figures 1, 2:
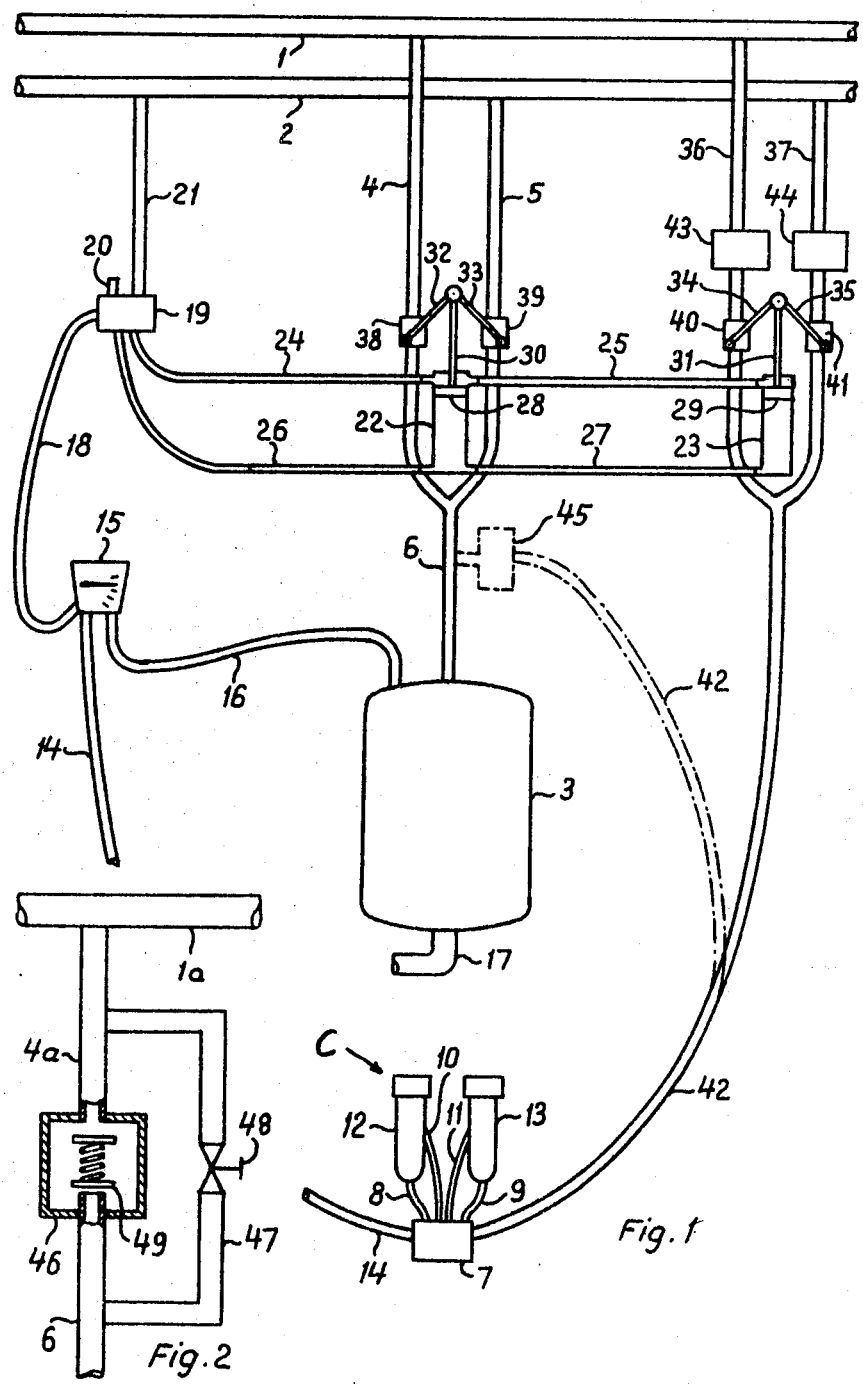

United States Patent [19]
Troberg et al.

[11] 3,754,532
[45] Aug. 28, 1973

[54] MILKING MACHINE

[75] Inventors: Bengt Erik-Mikael Troberg, Tumba; Carl Olof Claesson, Uppsala, both of Sweden

[73] Assignee: Alfa-Laval AB, Tumba, Sweden

[22] Filed: June 9, 1971

[21] Appl. No.: 151,371

Related U.S. Application Data
[63] Continuation-in-part of Ser. No. 878,294, Nov. 20, 1969, abandoned.

[52] U.S. Cl. .............................................. 119/14.08
[51] Int. Cl. .............................................. A01j 05/04
[58] Field of Search ...................... 119/14.08, 14.02

[56] References Cited
UNITED STATES PATENTS
3,377,992  4/1968  Baum .............................. 119/14.08
3,373,720  3/1968  Duncan ........................ 119/14.08 X Primary Examiner—Hugh R. Chamblee
Attorney—Davis, Hoxie, Faithfull & Hapgood

[57] ABSTRACT

A milk flow indicator is inserted in the pipeline through which the liners of the teat cups deliver milk to a vessel maintained under vacuum; and control means are operatively connected to this indicator for varying the vacuum in the vessel in response to changes in the milk flow in the pipeline, the control means acting to reduce the vacuum in response to substantial cessation of the milk flow. Preferably, the flow indicator is also arranged to vary a characteristic of the pulsations to which the teat cups are subjected by the pulsator means, such as the frequency of the pulsations and/or the ratio between the massage and suction periods of the pulsations.

6 Claims, 3 Drawing Figures

MILKING MACHINE

This application is a continuation-in-part of our application, Ser. No. 878,294, filed Nov. 20, 1969 now abandoned.

The present invention relates to machine milking and has particular reference too a novel machine which provides an improved milking performance.

Milking machines as presently constructed are intended to treat the teat in a constant manner from the moment when the teat cup is applied to the teat to the moment when the teat cup is removed, irrespective of whether milk flows from the teat or not. The milk flow from the teat means that the vacuum in the teat cup varies with changes in the milk flow. A particular disadvantage is that the teat is treated with a higher vacuum when milk is not flowing from the teat than when milk is flowing. If the teat cups are applied to the cow without sufficient preparatory stimulation (release of the suckling reflex), no milk will be released by the cow and the machine will run idle so that full vacuum acts upon the teat, whereby the teat cup will creep up to the udder. The teat is sucked down into the teat cup; and because of the teat liner design, it is very difficult to avoid impeding the milk flow as it begins, due to this creeping effect. In this condition, the machine also cause a discomfort to the cow, and the cow shows a tendency to retain the milk, with the resulting risk that the cow will cease to produce milk. Moreover, the risk of udder injuries is great. On the other hand, when the normal flow of milk from the udder commences, the flow resistance in the hose is increased so that the vacuum decreases in the teat cups to a value considerably lower than the desired milking value, whereby the milking operation becomes ineffective. When the milk flow from the udder has ceased at the end of the milking operation, the vacuum to which the teat is subjected is again increased to the vacuum which the vacuum pump of the system generates; and during all idle running, irrespective of the pulsating system, the teats are treated with this full vacuum.

Tests have proved that idle running of milking machines cannot be avoided. Idle running often occurs over a total period of at least one-half of the time during which the teat cups are on the udder. The risk of turning the teat channel openings out, while constricting the inner diameter of the channel, is very great; and such injuries occur frequently. These injuries prolong the milking operation and are also one of the causes for the requirement that the udder be treated manually by the milking machine operators during the final period of the machine milking. The need for such manual treatment also increases at the beginning of the milking operation, due to the previously mentioned creeping. The possibility of making the milking more effective, that is, of increasing the number of milked cows per man hour, would be very great if either the teat cups could remain on all cows for an equally long period of time (as by making the idle running harmless) or the teat cups could be removed automatically when the milk flow from the teats ceases.

For a long time attempts have been made to solve this problem in the latter way, and there are several known arrangements for automatic removal of the teat cups, when the milk flow from the teats ceases at the end of the milking operation. In these known arrangements, signals from a milk flow rate indicator are utilized for controlling mechanical devices which shut off the vacuum in the hoses to the teat cups when the milking operation is ended so that the teat cups fall from the udder. There are arrangements known as well which in addition catch the teat cups and remove them from the cow. Such arrangements are described for instance in the German patent specification 1,278,166 and in the U.S. Pat. specifications Nos. 2,496,307 and 3,246,631 dated Feb. 7, 1950, and Apr. 19, 1966, respectively.

We have found, however, that these problems may be solved in a better way if conditions are provided such that the teats are subjected to a gentle treatment during the periods when the milking machine is running idle, i.e., when no milk or milk only in small quantities flows from the teats, and such that the teats are subjected to normal vigorous treatment when the machine is actually working, i.e., when milk flows normally from the teats.

According to the present invention, a milk flow indicator is provided in the pipeline through which the milk flows under vacuum from the teat cup liners and control means are provided for varying the vacuum in the teat cup liners in response to variations in the milk flow as sensed by the indicator, the vacuum in the liners being lowered for a non-load condition (substantially no milk flow) and raised for an operating condition in which there is an essentially normal milk flow.

The invention also comprises an arrangement by which the pulsating means for operating the teat cups are under control of the milk flow indicator so that the frequency at which the teat cups are pulsated is varied with changes in the milk flow, the frequency preferably being lowered during idle running. This preference is due to the fact that the teats are particularly sensitive to mechanical treatment when no milk flows in them, and injuries easily develop if the massage frequency is not decreased during idling. For the same reason, the massage vacuum is preferably decreased to a lower value during the idling periods.

In a preferred form of the invention, the ratio between the massage (pressure) and the suction periods in the teat cups, incident to their operation by the pulsator means, is under control of the milk flow indicator, the suction periods preferably being maintained shorter during idle running than when milk is flowing. This change of the ratio between the massage (pressure) and the suction periods has the effect that the normal blood circulation is maintained in the teats during the periods of idling. It particularly leads to the restoration of the normal blood circulation in the teats, after the actual milking operation has been completed.

The different vacuum values can be obtained by providing two vacuum pipelines connected in parallel and inserting in one of these branch pipelines a reduction valve for lowering the vacuum value and inserting in the other pipeline a means operable to shut off this pipeline completely. According to the invention, however, it is preferred to provide a source of high vacuum and a source of low vacuum and arrange the milk flow indicator to connect one or the other of these vacuum sources to the milk-receiving vessel, depending upon the amount of milk flow sensed by the indicator. In this case, it is also preferred to provide a pulsator connected to each vacuum source and arrange the milk flow indicator so that it is operable to place one or the other of these pulsators into operation in the system, again depending upon the amount of milk flow sensed by the indicator.

Figure 3:
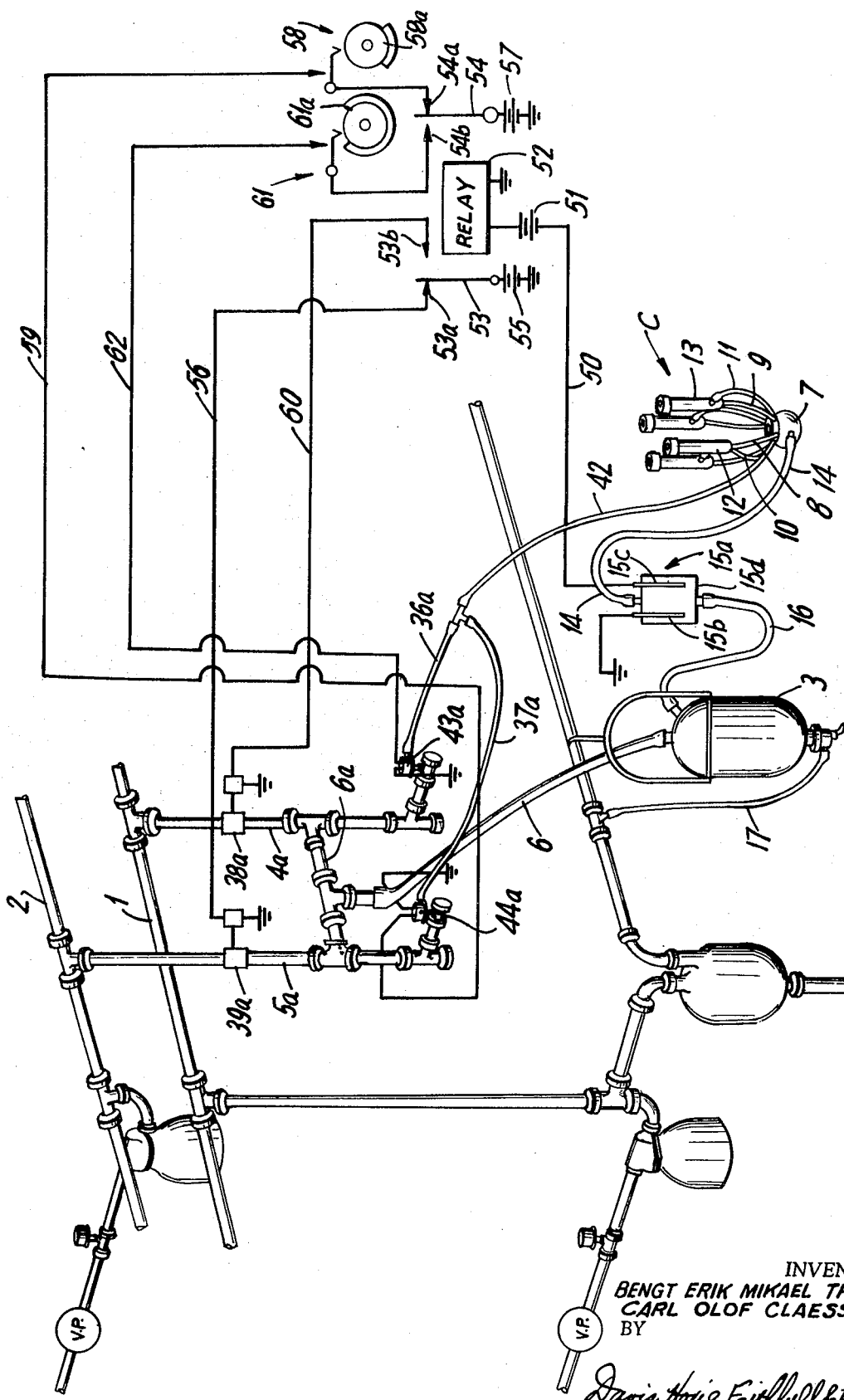

The invention is described more in detail in the following, reference being had to the accompanying drawings in which FIG. 1 is a schematic view of one embodiment of the present arrangement, FIG. 2 is a detailed view of a modification of the FIG. 1 embodiment, and FIG. 3 is a schematic view of another embodiment.

In FIG. 1, two different vacuum pipelines 1 and 2 are maintained under different vacuums. For example, the vacuums in these pipelines may be 250 mm. Hg and 550 mm. Hg, respectively, the pipeline 1 having the higher vacuum. A receiving vessel 3 for the milk is connected by means of hoses 4, 5 and 6 to the vacuum pipelines. A teat cup cluster C includes a claw 7 through which milk is led to a hose 14 from the milk tubes 8 and 9 of the liners in conventional teat cups 12 and 13. For the sake of simplicity the two other teat cups are not shown. The teat cups are pulsed pneumatically through the usual pulsation tubes 10 and 11 communicating with a hose 42. The milk hose 14 leads milk from the teat cup cluster via a milk flow indicator 15 and a hose 16 to a vessel 3, which is provided with a milk outlet 17. The impulses of the milk flow indicator (incident to changes in the milk flow rate) are transmitted by pneumatic means through a hose 18 to a changer 19. The latter has an inlet 20 for atmospheric air and a hose connection 21 to the vacuum pipeline 2. Two piston cylinders 22 and 23 are connected by pipelines 24, 25, 26 and 27 to the changer 19. Pistons 28 and 29 operate in the cylinders 22 and 23, respectively. Arm pairs 32–33 and 34–35 are articulated in the upper ends of the piston spindles 30 and 31, respectively. The arms 32 through 35 actuate shut-off means 38 through 41, respectively, such as hose clips inserted in the hoses 4 and 5 and in hoses 36 and 37. The hoses 36 and 37 and the hose 42 connect the teat cup cluster to the vacuum pipelines 1 and 2, and pulsators 43 and 44 are provided on the hoses 36 and 37.

Instead of the hoses 36 and 37 and the pulsators 43 and 44, a pulsator 45 can be provided on the hose 6, as shown by dash-dotted lines.

The arrangement operates in the following manner, it being assumed that the following description starts with the moment that the cow releases milk, that the hose clips 38 and 40 are opened and that the hose clips 39 and 41 are closed. The hose clips are so inserted in their hoses that, upon vertical movement of the spindles 30 and 31 in one direction, the clips 38 and 40 are opened while the clips 39 and 41 are closed, and vice versa. The vessel 3 is under the higher vacuum (clip 38 being open), and milk flows via the indicator 15 into the vessel 3. The pulsator 43, which is arranged to generate a certain pulsation frequency suitable for the milking operation and a suitable ratio between the massage and suction periods (e.g., 1 to 3), is placed in operation by means of the opened hose clip 40. When the milk flow from the cow begins to cease, the indicator 15 (flow sensing means) senses the reduced milk flow and pneumatically actuates the changer 19 via the hose 18, so that atmospheric air is supplied to the pipelines 24 and 25 from the air inlet 20 of the changer, while the pipelines 26 and 27 are evacuated by the pipeline 2 via the changer 19 and the hose 21. This means that the upper side of each piston 28 and 29 is subjected to atmospheric pressure and the underside to vacuum. The pistons then move downward to their bottom positions, and the spindles 30 and 31 operate through the arms 32 through 35 to adjust the shut-off means 38 to 41, whereby the vessel 3 is connected to the pipeline 2 with the lower vacuum and the pulsator 44 is put into operation, while the pulsator 43 is put out of operation. The pulsator 44 is designed to generate the frequency and the ratio between the massage and suction periods which are suitable for idle running. The pulsators 43 and 44 with the appertaining parts can be replaced by the pulsator 45, which is so arranged that, when influenced by the higher vacuum, it operates with a frequency suitable for milking and, when influenced by the lower vacuum, it operates with a frequency suitable for idle running. The pulsator 45 designed to function in this way is known in the art.

Instead of pneumatic transmission of impulses from the indicator 15 to the changer 19, a hydraulic impulse transmission can be used. When transmitting impulses electrically, the changer 19 and the piston means 22, 23, 28 and 29 can be replaced by magnet valves, which replace the hose clips 38 to 41.

Instead of two different vacuum pipelines 1 and 2, a single vacuum pipeline 1a can be used as shown in FIG. 2. In this case the hose 6 is connected to the pipeline 1a via a reduction valve 46 and a hose 4a. In a pipeline 47 there is inserted a magnetic valve 48, which can be actuated by the indicator 15. When an impulse from the indicator 15 records milk flow, the valve 48 is opened, so that the vessel 3 is put under the same vacuum as that prevailing in the pipeline 1a. In idle running, on the other hand, the valve 48 is closed by the action of flow indicator 15, so that the vacuum in the vessel 3 decreases due to the valve 46 reducing the evacuation through the hose 4a, in that a valve body 49, biased by a spring, throttles the inlet of the hose 6.

The arrangement according to the invention will operate so that at the beginning of the milking (before a substantial milk flow has been attained), the teat will be subjected only to such a low vacuum as is necessary to retain the teat cups on the teats. The teats thus receive a gentle treatment, which assists in increasing the emptying reflex; and the manual treatment for stimulating the udder to give off the milk can be completely eliminated. As soon as the milk flow begins, the vacuum is increased. When the milk flow then ceases, the vacuum decreases so that the teat cups are only retained on the teats. The change of vacuum can take place continuously or stepwise. Alternatively, the vacuum can be shut off when the milk flow has ceased, and the teat cups automatically removed from the teats.

As will be apparent from the foregoing description relating to FIGS. 1 and 2, there is provided a means for connecting the vacuum source means 1–2 to the teat cup cluster C to create a milking vacuum in the teat cup liners, such connecting means as illustrated comprising the parts 3–6, 16 and 14; and changes in the milk flow rate from the cluster are sensed by the sensing device 15 associated therewith. There is also provided a control means operatively connected at 18 to the sensing device 15 and comprising the parts 19, 22, 28, 32–33 and 38–39, such control means serving to reduce the milking vacuum from a working value to an idling value in response to a decrease in the milk flow rate, and to increase the milking vacuum from an idling value to a working value in response to an increase in the milk flow rate.

The aforementioned control means and sensing device are not disclosed in further detail with reference to FIGS. 1 and 2 because such details are believed to be within the skill of the art, and they can obviously take various forms to enable them to function in the manner previously described. However, such further details in one embodiment will now be described with reference to FIG. 3.

Referring to FIG. 3, the teat cups of the cluster C are pulsed pneumatically through hose 42, and milk from the cup liners is drawn into vessel 3 by way of claw 7, hose 14, milk flow indicator 15a and hose 16, as in FIG. 1. Also, as in FIG. 1, the receiving vessel 3 has a milk outlet 17 and is connected to the vacuum source means 1 and 2 through hose 6. In this case, there are pipes 4a and 5a branching from hose 6 and leading to the relatively high vacuum pipeline 1 and the relatively low vacuum pipeline 2, respectively; and the pipes 4a and 5a are provided with solenoid-operated valves 38a and 39a, respectively.

Electrically operated pulsators 43a and 44a, which may be of a conventional design, are connected to the high vacuum pipe 4a and the low vacuum pipe 5a, respectively, and communicate with pulsation hose 42 through respective branch hoses 36a and 37a. Each of these pulsators when energized operates in a manner well known in the art to connect the hose 42 alternately to vacuum and atmosphere, thereby pulsing the teat cup liners.

The milk flow indicator 15a is of a conventional type comprising a pair of electrodes 15b and 15c mounted in a sealed container 15d through which the milk passes from hose 14 to the hose 16 connected to a bottom outlet of the container, the electrodes being spaced from the container bottom. When the milk in the container is of sufficient depth to bridge the electrodes 15b-15c, a circuit is established from ground through the bridged electrodes, wire 50, current source 51, relay 52 and back to ground, thereby energizing relay 52. Otherwise (i.e., with electrodes 15a-15b unbridged by the milk in flow indicator 15a), the relay 52 is deenergized so that its switch arms 53 and 54 engage contacts 53a and 54a, respectively, as shown in FIG. 3. In this position of arm 53, a circuit is established from ground through current source 55, the closed switch 53-53a, wire 56, the solenoid of valve 39a and back to ground, thereby holding the low vacuum valve 39a open. At the same time (with relay 52 deenergized), another circuit is established from ground through current source 57, closed switch 54-54a, a low speed motor-driven switch 58, wire 59, pulsator 44a and back to ground.

Thus, with relay 52 deenergized, the milk is drawn into vessel 3 from the teat cup liners under a relatively low or "idling" vacuum by way of claw 7, hose 14, flow indicator 15a and hose 16, since vessel 3 is connected to the low vacuum pipeline 2 by way of solenoid valve 39a. At the same time, pulsator 44a is energized periodically by switch 58 to connect the pulsing chambers of the teat cups alternately to atmosphere and the low vacuum pipeline 2.

On the other hand, with relay 52 energized as previously explained, the switch arms 53 and 54 engage contacts 53b and 54b, respectively, and disengages the respective contacts 53a and 54a, thus breaking the circuits through solenoid valve 39a and pulsator 44a, whereby valve 39a is closed and pulsator 44a is rendered inactive. At the same time, solenoid valve 38a is energized through closed switch 53-53b and wire 60, and pulsator 43a is energized through closed switch 54-54b, a high speed motor-driven switch 61 and wire 62. Thus, the milk is now drawn into vessel 3 under the relatively high or "working" vacuum, since this vessel is now connected to pipeline 1 by way of valve 38a; and the pulsing chambers of the teat cups are alternately connected to atmosphere and the high vacuum pipeline 1 by pulsator 43a.

The switches 58 and 61 are opened and closed periodically by respective motor-driven cams 58a and 61a. Cam 58a is driven at relatively low speed (e.g., 30 RPM), whereas cam 61a is driven at relatively high speed (e.g., 60 RPM), with corresponding values for the pulsation frequencies of the respective pulsators 44a and 43a. Also, as indicated in FIG. 3, the cam 58a holds its switch 58 closed over a substantially shorter time period during each pulsation cycle, as compared to cam 61a and its switch 61. Consequently, when pulsator 43a is operating, the periods of suction in the pulsing chambers of the teat cups are substantially longer than is the case when pulsator 44a is operating.

The motors (not shown) for driving the pulsing switches 58 and 61 may be operated continuously while the milking machine is in operation, or each motor may be energized only when switch arm 54 is positioned for operation of the corresponding pulsator.

As will be apparent from the foregoing, relay 52 is deenergized at the start and finish of the milking operation, since the rate of milk flow through flow indicator 15a is then incapable of maintaining a milk level sufficient to bridge the electrodes 15b-15c. Accordingly, during these "idling" periods, the teat cup liners are connected through valve 39a to the low vacuum source 2, and the teat cups are pulsed at the relatively low frequency and with relatively short suction periods of relatively low vacuum under control of the pulsing switch 58. However, during normal milking, the liners are connected through valve 38a to the high vacuum source 1, and the teat cups are pulsed at the relatively high frequency and with relatively long suction periods of relatively high vacuum under control of pulsing switch 61.

The flow indicator 15a, as previously indicated, has its sensing electrodes 15b-15c sealed to and depending from the top of the closed container 15d, so that the vacuum in this container is not impaired by leakage from the surrounding atmosphere. The container 15d may be made of a transparent plastic material, so that it is electrically insulating and permits visual inspection of the milk flow. Also, it may be made of two parts which are detachable from each other to permit cleaning. Such a flow indicator is sold by The DeLaval Separator Company, Poughkeepsie, New York, as part of a so-called Milker Unit Control (Part No. 8301355-80), which also includes the relay 52 and the solenoid valves 38a-39a.

Although the apparatus of FIG. 3 is shown as including two pulsators 43a and 44a associated with the high vacuum and low vacuum pipelines 1 and 2, respectively, it will be understood that only one pulsator may be employed. In that case, the single pulsator may be connected directly to pulsation hose 42 and to a pipe which joins the pipes 4a and 5a below the interconnecting pipe 6a to which hose 6 leads, and the wires 59 and 62 may have a common terminal connected through the single pulsator to ground, whereby the single pulsator is operated by one or the other of the pulsing switches 48 and 61 while connected to the low vacuum pipeline 2 or the high vacuum pipeline 1, respectively, depending upon whether the relay 52 is deenergized or energized.

We claim:

1. In a milking machine, the combination of a cluster of teat cups having teat-receiving liners, vacuum source means including a relatively high vacuum source and a relatively low vacuum source, valve means having first and second conditions for connecting the cluster to said high and to said low vacuum sources, respectively, thereby creating in said liners a milking vacuum of working value and idling value, respectively, a flow rate sensing device associated with said cluster and operable independently of said valve means for sensing changes in the rate of milk flow from the cluster, and means operatively connecting said device to said valve means for actuating the valve means from said first to said second condition in response to a decrease in said flow rate and from said second to said first condition in response to an increase in said flow rate.

2. The combination defined in claim 1, comprising also pulsator means associated with the teat cups for subjecting them periodically to a massage vacuum to operate the teat cups, and control means operatively connected to said sensing device for reducing said massage vacuum from a working value to an idling value in response to a decrease in said flow rate, said control means being operable to increase the massage vacuum from an idling value to a working value in response to an increase in said flow rate.

3. The combination defined in claim 1, comprising also pulsator means associated with the teat cups for subjecting them periodically to a massage vacuum to operate the teat cups, and means operable by said sensing device for varying the frequency at which the teat cups are pulsed by the pulsator means.

4. The combination according to claim 1, comprising also pulsator means associated with the teat cups for operating the same to provide massage and suction periods in the teat cups, and means operable by said flow sensing device for varying the ratio between said massage and suction periods.

5. The combination according to claim 1, comprising also first and second vacuum pulsators connected to the high and low vacuum sources, respectively, each pulsator being operable to subject the teat cups periodically to a massage vacuum to operate the teat cups, and control means operatively connected to said sensing device for bringing the pulsators into operation alternately in response to changes in said flow rate, said first pulsator being brought into operation in response to an increase in the flow rate.

6. The combination according to claim 1, comprising also means for connecting the valve means to the cluster including a milk-receiving vessel, said sensing device being located in said connecting means between the cluster and the milk-receiving vessel, said valve means being operable by the sensing device to reduce the vacuum in the vessel in response to a decrease in said flow rate and to increase said last vacuum in response to an increase in said flow rate.

* * * * *